(12) United States Patent
Salter et al.

(10) Patent No.: US 10,793,094 B2
(45) Date of Patent: Oct. 6, 2020

(54) COMMUNICATION GRILLE ASSEMBLY

(71) Applicant: Ford Global Technologies, LLC, Dearborn, MI (US)

(72) Inventors: Stuart C. Salter, White Lake, MI (US); David Brian Glickman, Southfield, MI (US); LaRon Michelle Brown, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/422,036

(22) Filed: May 24, 2019

(65) Prior Publication Data

US 2020/0262377 A1 Aug. 20, 2020

Related U.S. Application Data

(60) Provisional application No. 62/807,908, filed on Feb. 20, 2019.

(51) Int. Cl.
| | |
|---|---|
| *B60R 19/52* | (2006.01) |
| *B60Q 1/26* | (2006.01) |
| *B60Q 1/50* | (2006.01) |
| *F21S 43/14* | (2018.01) |
| *G06K 9/00* | (2006.01) |
| *F21W 107/10* | (2018.01) |
| *F21Y 115/10* | (2016.01) |

(52) U.S. Cl.
CPC ............ *B60R 19/52* (2013.01); *B60Q 1/2661* (2013.01); *B60Q 1/2696* (2013.01); *B60Q 1/503* (2013.01); *F21S 43/14* (2018.01); *F21W 2107/10* (2018.01); *F21Y 2115/10* (2016.08); *G06K 9/00221* (2013.01)

(58) Field of Classification Search
CPC .............. B60R 19/52; B60R 2019/522; B60R 2019/525; B60R 2019/527; F21S 43/14; F21S 41/153; B60Q 1/2661; B60Q 1/2696; B60Q 1/503; F21W 2107/10; G06K 9/00221
USPC .................................................. 362/496, 502
See application file for complete search history.

(56) References Cited

U.S. PATENT DOCUMENTS

| | | | |
|---|---|---|---|
| 5,452,931 A * | 9/1995 | Chase .................... | B60K 11/08 180/68.6 |
| 7,095,318 B1* | 8/2006 | Bekhor .................... | B60Q 1/26 340/485 |
| 9,162,616 B2* | 10/2015 | Wu .......................... | B60Q 1/50 |
| 9,656,598 B1* | 5/2017 | Salter .................... | B60Q 1/2696 |
| 9,714,749 B1 | 7/2017 | Salter et al. | |
| 10,281,113 B1* | 5/2019 | Salter .................... | F21S 41/153 |
| 10,576,877 B2* | 3/2020 | Moore .................... | B60R 19/52 |
| 2005/0094409 A1* | 5/2005 | Elwell .................. | B60Q 1/2661 362/496 |
| 2009/0072556 A1* | 3/2009 | Kudelko ................. | B60R 19/52 293/115 |

(Continued)

*Primary Examiner* — Alan B Cariaso
(74) *Attorney, Agent, or Firm* — David Coppiellie; Price Heneveld LLP

(57) ABSTRACT

A vehicle communication system includes a vehicle body panel and a camera having a field of view. The camera is disposed on the vehicle body panel. A grille assembly is coupled to the vehicle body panel. The grille assembly includes a plurality of light sources, an optic layer defining channels disposed adjacent to the light sources, and a metalized sheet disposed on the optic layer.

17 Claims, 7 Drawing Sheets

(56) References Cited

U.S. PATENT DOCUMENTS

| | | | |
|---|---|---|---|
| 2014/0022390 A1* | 1/2014 | Blank | B60R 1/12 348/148 |
| 2014/0036428 A1* | 2/2014 | Leong | H03K 17/9622 361/679.01 |
| 2015/0138807 A1 | 5/2015 | Salter et al. | |
| 2015/0202939 A1* | 7/2015 | Stettner | B60R 1/00 701/37 |
| 2017/0210285 A1 | 7/2017 | Kobayashi et al. | |
| 2018/0334088 A1 | 11/2018 | Salter et al. | |
| 2019/0035264 A1 | 1/2019 | Salter et al. | |

* cited by examiner

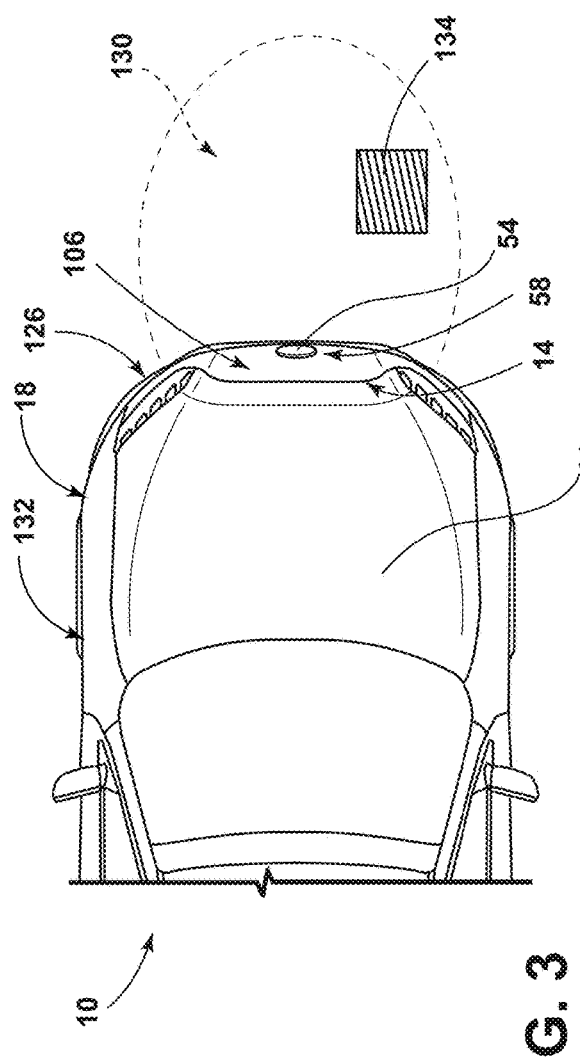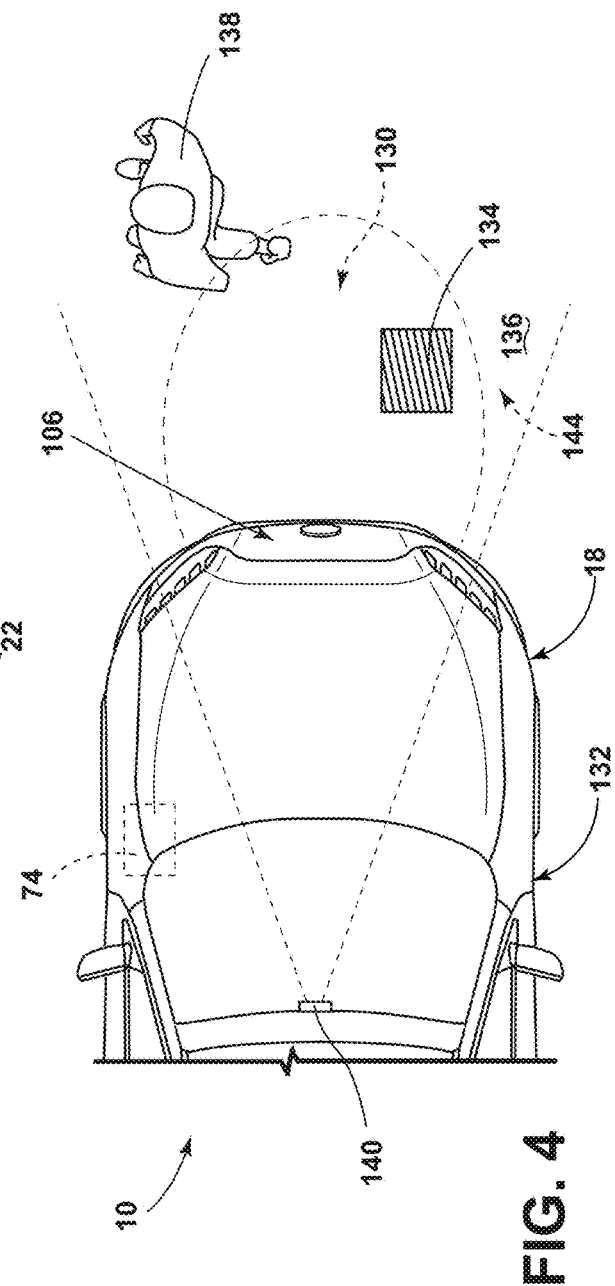

COMMUNICATION GRILLE ASSEMBLY

CROSS-REFERENCE TO RELATED APPLICATIONS

This application claims priority to U.S. Provisional Application No. 62/807,908, filed on Feb. 20, 2019, entitled, "GRILLE ASSEMBLY," the disclosure to which is hereby incorporated herein by reference in its entirety.

FIELD OF THE DISCLOSURE

The present disclosure generally relates to a grille assembly. More specifically, the present disclosure relates to a vehicle grille assembly communication system.

BACKGROUND OF THE DISCLOSURE

Automotive vehicles are commonly equipped with grille assemblies that provide for ventilation. However, some vehicles may require more ventilation, and other vehicles may require lesser ventilation. In addition, light assemblies of vehicles have been proposed as indicator lights to identify or communicate to a user.

SUMMARY OF THE DISCLOSURE

According to at least one aspect of the present disclosure, a vehicle communication system includes a vehicle body panel and a camera having a field of view. The camera is disposed on the vehicle body panel. A grille assembly is coupled to the vehicle body panel. The grille assembly includes a plurality of light sources, an optic layer defining channels disposed adjacent to the light sources, and a metalized sheet disposed on the optic layer.

According to at least one aspect of the present disclosure, a vehicle communication system includes a vehicle panel and a grille assembly coupled to the vehicle panel. The grille assembly includes a substrate, at least one light source coupled to the substrate, a film positioned over the at least one light source, and a metal layer coupled to an inner surface of the film. A controller is operably coupled to the light sources, wherein the controller activates the light sources.

According to at least one aspect of the present disclosure, a grille assembly communication system includes a substrate and a printed circuit board disposed on the substrate. A plurality of light sources is coupled to the printed circuit board. The plurality of light sources is disposed in a matrix. An optic layer is disposed adjacent to the plurality of light sources and defines channels over each light source of the plurality of light sources. A film is positioned over the optic layer.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 3 is a top view of a vehicle with an object in a sensor field, according to one example;

FIG. 4 is a top view of a vehicle having an object and a person within a sensor field and a field of view, according to one example;

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
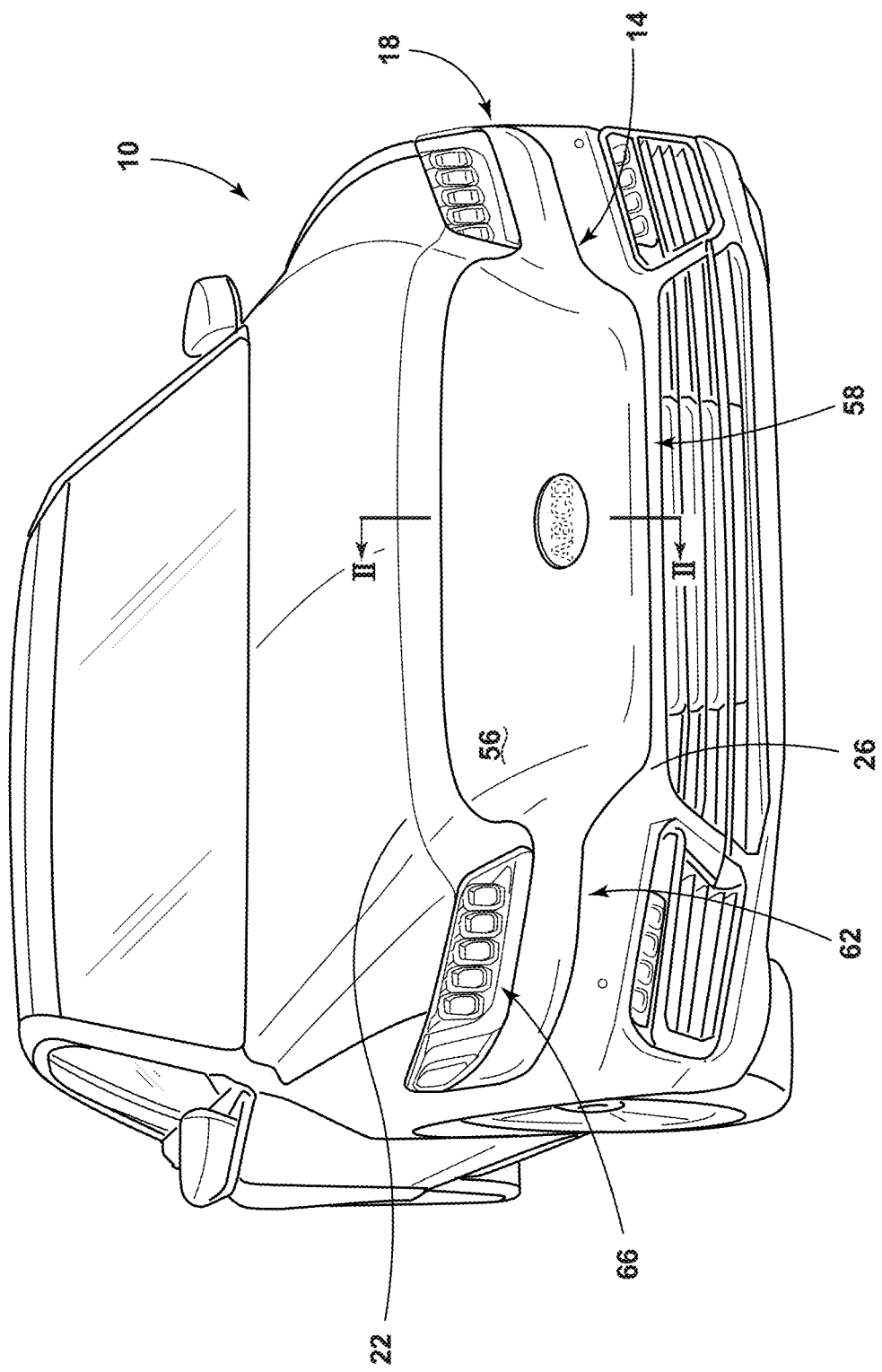
FIG. 1 is a front perspective view of a vehicle having a grille assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, reference numeral 10 generally designates a vehicle having a grille assembly 14 on a body panel 18 of the vehicle 10. The grille assembly 14 is generally positioned between a hood 22 and a bumper assembly 26. The grille assembly 14 may include a substrate 30, a printed circuit board (PCB) 34, and a plurality of light sources 38. The grille assembly 14 may further include an optic layer 42 disposed adjacent to the light sources 38 and a film 46 disposed adjacent to the optic layer 42. Additionally, the grille assembly 14 may further include a metal layer 50 disposed between the optic layer 42 and the film 46. Further, an emblem 54 may be affixed to the grille assembly 14.

Referring to FIG. 1, the grille assembly 14 may form a substantially flat and/or continuous panel coupled to the body panel 18. In various examples, the grille assembly 14 may be substantially planar and/or linear. Accordingly, the body panel 18 and an exterior surface 56 of the grille assembly 14 may form a continuous surface. As illustrated in FIG. 1, the grille assembly 14 has a greater height in a center portion 58 of the grille assembly 14 compared to opposing side portions 62. It is contemplated that the grille assembly 14 may be different shapes and/or sizes depending on the configuration of the grille assembly 14 and/or the model of the vehicle 10. The opposing side portions 62 are illustrated as extending below headlamp assemblies 66, however, it is contemplated that the grille assembly 14 may include the headlamp assemblies 66. It is also contemplated that in various examples the grille assembly 14 may include daylight running lamps, protective layers, and/or decorative layers without departing from the teachings herein. The vehicle 10 may be a battery electric vehicle, a hybrid electric vehicle, a plug-in electric vehicle, or other types of vehicle 10. Electric vehicles 10 may use smaller ventilation grille assemblies 14. Accordingly, the grille assembly 14 may form a continuous surface between the hood 22 and the bumper assembly 26. The vehicle 10 is illustrated as a sedan, but may also be a crossover, truck, sport utility vehicle, van, or other style of vehicle 10. The vehicle 10 may be a manually operated vehicle 10 (e.g., with a human driver), a fully autonomous vehicle 10 (e.g., no human driver), or a partially autonomous vehicle 10 (e.g., may be operated with or without a human driver). Additionally, the vehicle 10 may be utilized for personal and/or commercial purposes, such as for ride-providing services (e.g., chauffeuring) and/or ride-sharing services.

Figure 2:
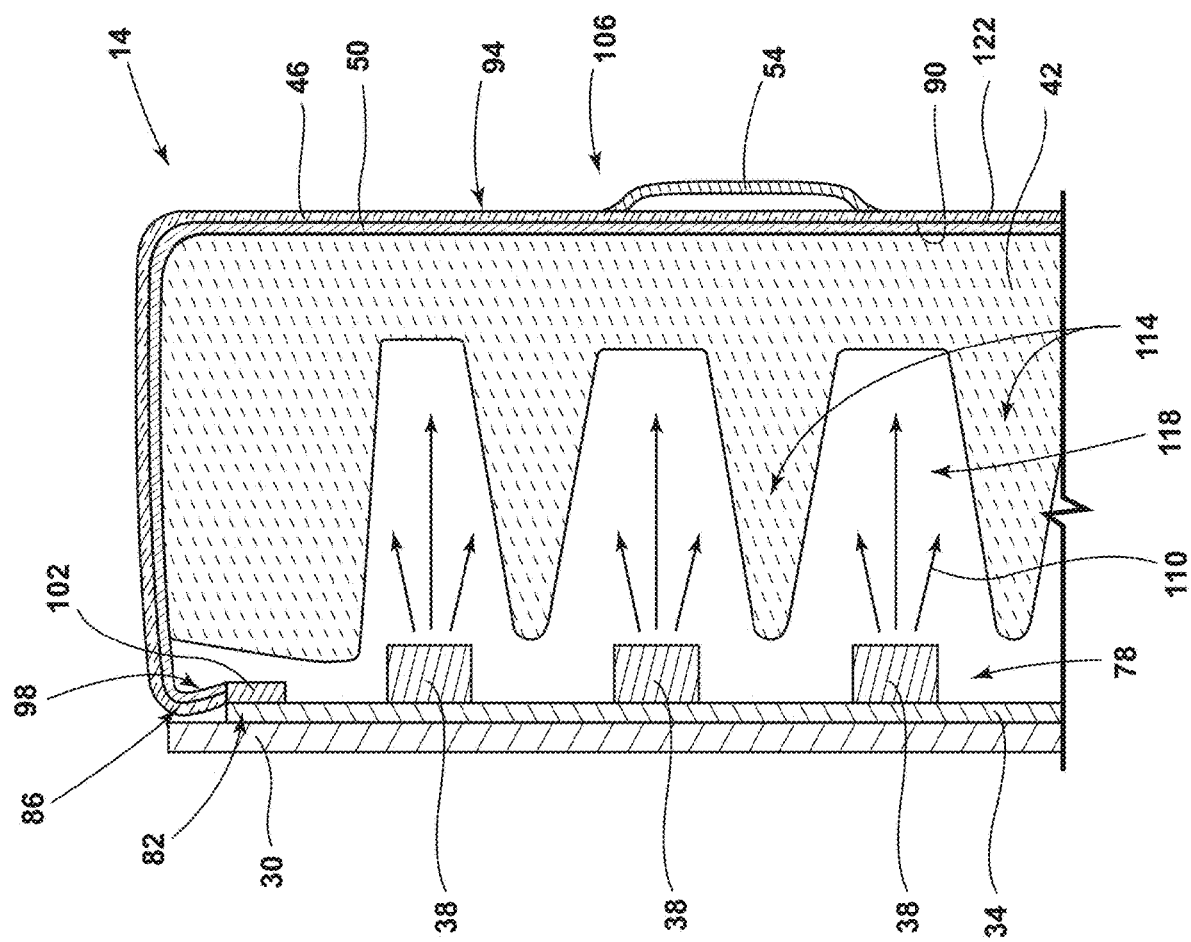
FIG. 2 is a cross-sectional view taken across line II-II of FIG. 1 of the grille assembly, according to one example.

Referring now to FIG. 2, the grille assembly 14 includes the substrate 30, which may be disposed on or otherwise coupled to the body panel 18 of the vehicle 10 (FIG. 1). The substrate 30 may be, for example, thermally conductive plastic materials or other similar material. In various examples, the substrate 30 may operate as a heatsink, such that the substrate 30 transfers heat generated by the PCB 34, the light sources 38, and/or other components of the grille assembly 14 away from the grille assembly 14. The substrate 30 may also be advantageous to increase the structural strength of the grille assembly 14. Further, the substrate 30 may also provide the grille assembly 14 with flexibility to allow the grille assembly 14 to flex in response to contact or other force acting on the grille assembly 14.

In various examples, the PCB 34 may be coupled to and/or disposed on the substrate 30. The PCB 34 may be configured as a rigid PCB or a flexible PCB. It may be advantageous for the grille assembly 14 to include a flexible PCB 34 to allow for components of the grille assembly 14 to contact and/or press against the PCB 34 without overstressing the PCB 34. The PCB 34 may be operably coupled to a controller 74 (FIG. 4) and may include control circuitry, including light or LED drive circuitry for controlling activation and deactivation of the light sources 38. As illustrated, the light sources 38 are disposed on the PCB 34. The PCB 34 and/or the light sources 38 may be coupled to the substrate 30 via, for example, adhesives. In various examples, the light sources 38 may be configured as an array or matrix 78 of light sources 38. The matrix 78 may include any number of light sources 38 in any orientation without departing from the teachings herein. The matrix 78 may extend across the entire substrate 30 or may extend across a portion of the substrate 30. Further, the matrix 78 may extend across all or a portion of the grille assembly 14.

The light sources 38 may include any form of light source. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the grille assembly 14. Further, various types of LEDs are suitable for use as the light sources 38 including, but not limited to, top-emitting LEDs, side-emitting LEDs, and others. Moreover, according to various examples, multicolored light sources 38, such as Red, Green, and Blue (RGB) LEDs that employ red, green, and blue LED packaging may be used to generate various desired colors of light outputs from a single light source 38, according to known light color mixing techniques.

Referring still to FIG. 2, as illustrated, the film 46 is positioned over and spaced apart from the light sources 38 and PCB 34. The film 46 may form a continuous surface substantially parallel to the substrate 30. The film 46 may also be coupled to edge portions 82 of the PCB 34. The film 46 includes film end portions 86 that may extend inward towards the light sources 38 proximate to the PCB 34. Accordingly, the film 46 may at least partially enclose the light sources 38. In various examples, the film 46 may provide, for example, a chrome-like appearance for the grille assembly 14. Other decorative or functional appearances are also contemplated. For example, the film 46 may be substantially transparent. Additionally or alternatively, the film 46 may include a material that appears opaque when backlighting is deactivated (e.g., the light sources 38 are deactivated), but allows backlighting to be visible when the light sources 38 are activated. Further, the film 46 may be conductive and/or include conductive materials. In a specific example, the film 46 may be a partial vacuum metalized film. In additional examples, the film 46 may be a metallic film applied to a non-metallic member via partial vacuum metallization. In such examples, the non-metallic member may include plastic materials. Additionally or alternatively, the film 46 may also be a metalized foil that is applied via hot stamping processes. In various examples, the film 46 may also include, for example, metal materials and/or plastic materials. In such examples, the film 46 may be formed via physical vapor deposition in which a metal material is applied to a polycarbonate plastic material. A metal material, such as, for example, a chrome material, may be applied to the resulting thermoformed film 46.

The grille assembly 14, as illustrated in FIG. 2, includes the metal layer 50 disposed on an inner surface 90 of the film 46. The metal layer 50 may be applied to the inner surface 90 of the film via partial vacuum metallization. The combination of the metal layer 50 and the film 46 may provide for a metalized sheet 94. The film 46, the metal layer 50, and/or the metalized sheet 94 may be light permeable. The metal layer 50 includes layer end portions 98, which may extend inward toward the light sources 38 adjacent to the substrate 30. In various examples, the film end portions 86 and the layer end portions 98 may be coupled together and/or may be defined by the metalized sheet 94.

In various examples, the film and layer end portions 86, 98 are coupled to an electrical connector 102. In such examples, the film 46, the metal layer 50, and/or the metalized sheet 94, are electrically conductive. The electrical connector 102 may be a zero insertion force (ZIF) connector, in a specific example. Use of a ZIF electrical connector 102 may be advantageous for including an electrical connector 102 that utilizes less force (e.g., the weight of the electrical connector 102) to couple to the PCB 34. The metal layer 50, the film 46, and/or the metalized sheet 94 may be coupled to the electrical connector 102, which allows the grille assembly 14 to operate as a capacitive sensor. In various examples, the grille assembly 14 may have a capacitive portion 106, defined by the metal layer 50, the film 46, and/or the metalized sheet 94.

With further reference to FIG. 2, the grille assembly 14 includes the optic layer 42 disposed on the inner surface 90 of the film 46, the metal layer 50, and/or the metalized sheet 94. The optic layer 42 may be advantageous for increasing the structural strength of the film 46 while retaining a selected amount of flexibility in the grille assembly 14. In various examples, the optic layer 42 may include a material that is configured to flex when pressed. Additionally, the optic layer 42 may be configured to deform in response to a predetermined force acting on the optic layer 42. The optic layer 42 may be overmolded to the inner surface 90 of the film 46, metal layer 50, and/or metalized sheet 94, in specific examples. Additionally or alternatively, the optic layer 42 may include silicone, clarified polypropylene, or other similar materials. The optic layer 42 may also operate to guide and/or direct emitted light 110 from the light sources 38 outward from the grille assembly 14. It is also contemplated that the optic layer 42 includes separate optic members without departing from the teachings herein.

As illustrated in the example of FIG. 2, the optic layer 42 is spaced-apart from the light sources 38, the PCB 34, and the substrate 30. Additionally, the optic layer 42 defines ribs 114 disposed between vertically adjacent light sources 38. The ribs 114 extend in a vehicle-rearward direction from the film 46 towards the light sources 38. It is also contemplated that the ribs 114 may also extend between horizontally adjacent light sources 38, or otherwise extend between light sources 38 and/or within the matrix 78 of light sources 38. In various examples, the optic layer 42 may be configured to press against the PCB 34 without overstressing the PCB 34. Additionally, the ribs 114 may be configured to deform when pressed against or otherwise contacting the PCB 34. The ribs 114 may also define channels 118 between adjacent ribs 114. The channels 118 may operate as a light tube. In other words, the channels 118 may separate emitted light 110 of adjacent light sources 38. Accordingly, the channels 118 may allow the light sources 38 to project specific words, graphics, and/or images without the emitted light 110 of a single light source 38 interfering with the emitted light 110 of an adjacent light source 38.

Referring still to FIG. 2, the emblem 54 may be disposed on or otherwise coupled to the metal layer 50. As such, the emblem 54 may be disposed between the metal layer 50 and the film 46. As illustrated, the emblem 54 is raised, such that it extends away from an outer surface 122 of the metal layer 50. The emblem 54 may be any design, image, word and/or logo. The emblem 54 may be shaped as a circle, oval, triangle, square, rectangle, hexagon, any other higher order polygonal shape, or an irregular shape. The emblem 54 may also be larger or smaller than illustrated. In various examples, the optic layer 42 may provide different optics for the emblem 54 compared to the surrounding grille assembly 14. The optics may provide for different lighting intensity, color, or another distinguishing feature that visually separates the emblem 54 from the surrounding grille assembly 14. For example, the emblem 54 may be illuminated by light sources 38 emitting blue light, while the surrounding grille assembly 14 may be illuminated in another color or not illuminated.

Referring now to FIG. 3, the capacitive portion 106 of the grille assembly 14 may substantially align with the center portion 58 of the grille assembly. However, it is also contemplated that the capacitive portion 106 may extend to the side positions 126 of the grille assembly 14 and/or extend across the entire grille assembly 14. As previously explained, the capacitive portion 106 may result from the film and layer end portions 86, 98 of the film 46 and metal layer 50, respectively, being coupled to the electrical connector 102 positioned on the PCB 34 (FIG. 2). The capacitive portion 106 may operate in a similar manner as a capacitive sensor. In a specific example, the capacitive portion 106 may sense and/or measure a distance to an object 134 that is conductive and/or has a dielectric constant different from air. The measured capacitance may depend on a dielectric constant of an object 134 and/or the size of the same object 134.

In various examples, the capacitive portion 106 of the grille assembly 14 may have a sensor field 130. The sensor field 130 may extend from the body panel 18 of the vehicle 10 and into a surrounding area 136. The sensor field 130 is illustrated extending in a vehicle-forward or vehicle-side direction but may also extend to a vehicle-side or vehicle-rearward direction. In other words, the sensor field 130 may extend outward from a body 132 of the vehicle 10. The sensor field 130 may differ based on the type of object 134 being sensed. The sensor field 130 may exponentially increase in sensitivity as the distance between the object 134 and the grille assembly 14 decreases. In a specific example, the capacitive portion 106 may sense a large metal conductive object (e.g., a semi-truck) in a range of from about 7 feet to about 15 feet away from the capacitive portion 106. In another example, the capacitive portion 106 may sense a mid-sized conductive object (e.g., a car) in a range of from about 7 feet to about 10 feet away from the capacitive portion 106. In another example, the capacitive portion 106 may sense a person 138 (FIG. 4) in a range of from about 3 feet to about 5 feet away from the capacitive portion 106. In an additional example, the capacitive portion 106 may sense a small non-conductive object (e.g., a concrete post) from about one foot away from the capacitive portion 106. It is also contemplated that the capacitive portion 106 may sense contact to the capacitive portion 106. In such examples, the capacitive portion 106 and the controller 74 (FIG. 4) may determine a rate of change and/or a range of signal to determine if and/or when the object 134 is in contact with the grille assembly 14. In various examples, the emblem 54 may be included in the capacitive portion 106 and may also sense contact to the emblem 54 or an object 134 within a specified distance from the emblem 54.

It is also contemplated that the grille assembly 14 may include various additional sensors, such as, for example, a LiDAR system or a proximity sensor configured to measure the distance to the object 134. It is further contemplated that the sensors may send a signal to the controller 74, and the controller 74 may subsequently alert other drivers and/or pedestrians via a sound signal, visual signal, or a combination thereof. The various additional sensors may also be configured to recognize a palm print and/or a fingerprint of a specific person or people 138 (FIG. 4). Accordingly, the sensors may be configured to recognize the palm print and/or the fingerprint and subsequently open a storage compartment defined by the hood 22 and the body panel 18.

Referring now to FIG. 4, the capacitive portion 106 of the grille assembly 14 may be used in conjunction with a camera 140 or other vision-based device. The camera 140 includes an image sensor having an area-type image sensor, such as a CCD or a CMOS image sensor and image-capturing optics, which captures an image of an imaging field of view 144 defined by the image-capturing optics. Additionally or alternatively, the camera 140 may sense an object 134 in the field of view 144 and the capacitive portion 106 may detect the distance to the object 134 in the sensor field 130. In various examples, the camera 140 may include facial recognition software 142 to detect faces and/or compare detected images to a stored database of images. The capacitive portion 106 and/or camera 140 may be operably coupled to the controller 74. The information sensed by the capacitive portion 106 and detected by the camera 140 may be conveyed to the controller 74. In various examples, the camera 140 may be installed on the grille assembly 14 or otherwise installed on the vehicle 10. For example, the camera 140 may be positioned within the grille assembly 14 between the body panel 18 and the optic layer 42 (FIG. 2). In another example, the camera 140 may be coupled to the body 132 of the vehicle 10 and include the field of view 144 extending into the surrounding area 136 forward of the vehicle 10. In other words, the field of view 144 may extend outward from the body 132 of the vehicle 10. The vehicle 10 may also include more than one camera 140 configured to capture images of different angles and/or areas proximate the vehicle 10. It is also contemplated that the grille assembly 14 may include positive temperature coefficient (PTC) heating circuits configured to prevent rain, snow, and/or other moisture from decreasing and/or disabling the function of, for example, the light sources 38, the camera 140, various vehicle systems (e.g., adaptive cruise control), and/or additional sensors (e.g., LiDAR).

Figure 5:
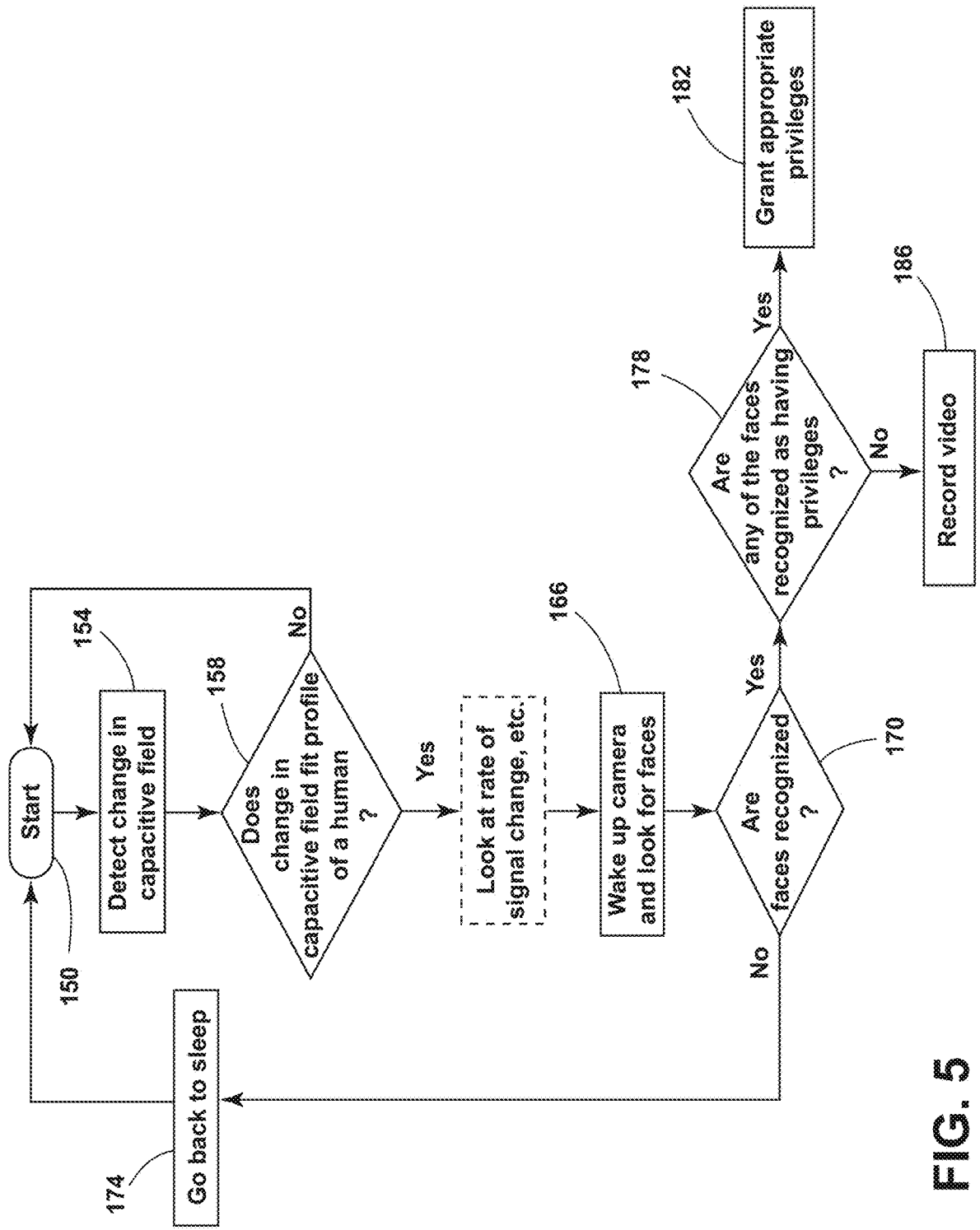
FIG. 5 is a flow diagram for a method of recognizing people and faces and granting privileges with a capacitive portion of a grille assembly and a camera, according to one example.
Figure 7:
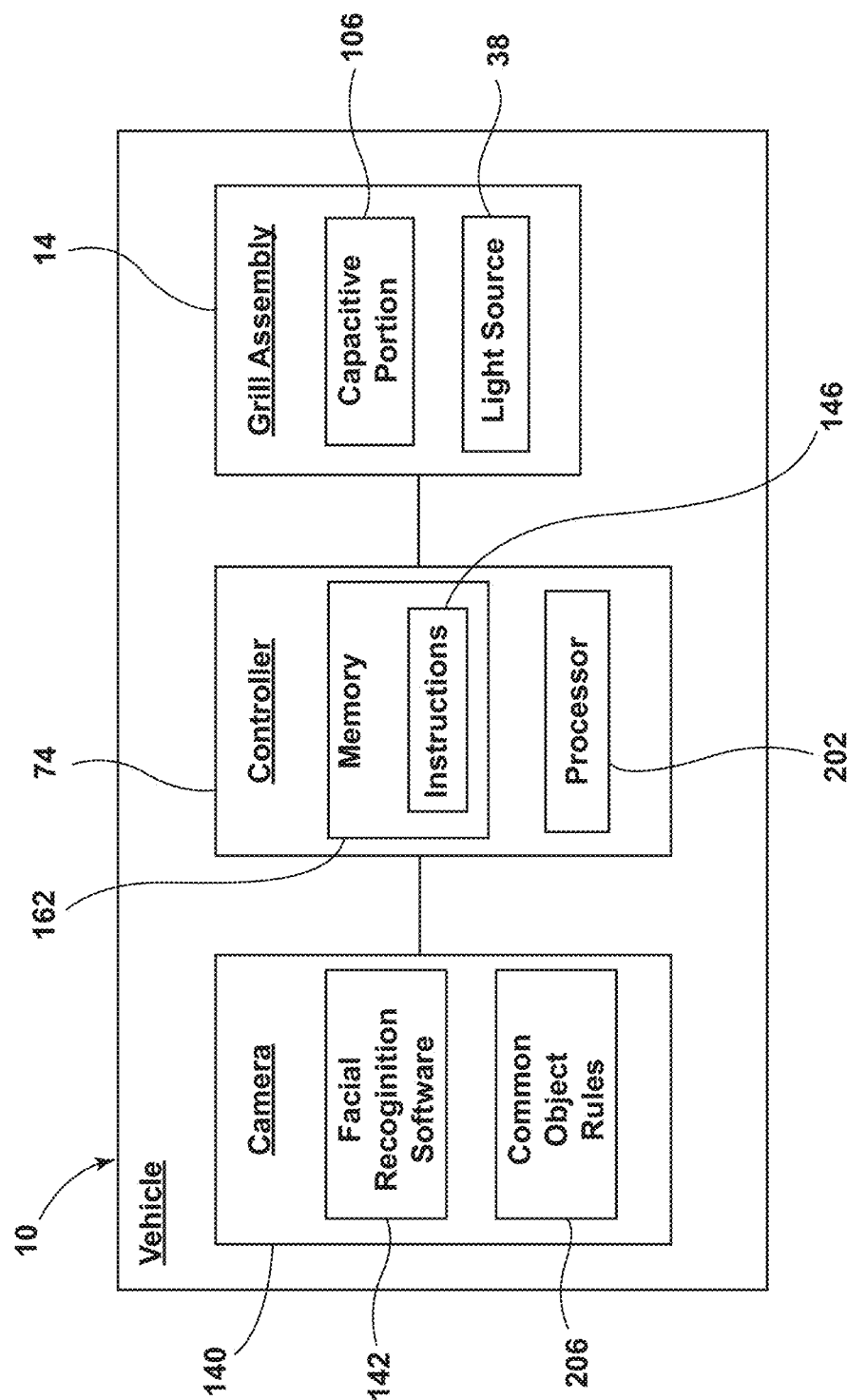
FIG. 7 is a block diagram of a vehicle, according to one example.

Referring to FIGS. 4, 5, and 7, the controller 74 may include various instructions 146 relating to various functions. In various examples, the controller 74 may determine if the object 134 proximate the vehicle 10 is a person 138. Further, at least one instruction 146 may correspond with recognizing faces detected by the camera 140 and granting corresponding privileges. Accordingly, the camera 140 may include the field of view 144 and be operably coupled to the controller 74. At least one instruction 146 begins at step 150 and proceeds to step 154 to detect a change in a capacitive field (e.g., the sensor field 130 of the capacitive portion 106). The capacitive portion 106 of the grille assembly 14 may sense an object 134 and/or a person 138 in the sensor field 130. The sensed information may be conveyed to the controller 74. Next, at decision step 158 the controller 74 compares the sensed information received from the capacitive portion 106 to a saved profile for a human. The saved profile may be included in a memory 162 of the controller 74. The saved profile may include information relating to rate of movement of the object 134, dielectric constant of the object 134, and/or signature of the object 134 being within a specified range. If the sensed information does not correspond to the profile of a person 138, the instruction 146 returns to step 150. Alternatively, if the sensed information does correspond to the profile of a person 138, the instructions 146 proceeds to step 166 where the controller 74 activates the camera 140. Accordingly, the capacitive portion 106 sends a signal to the controller 74 in response to sensing an object 134 or person 138 in the sensor field 130, and the controller 74 sends a corresponding signal to the camera 140 to activate the camera 140. The camera 140 detects the person 138 in the field of view 144 and may be configured to sense a face of the person 138 within using the facial recognition software 142. Once the camera 140 detects a face or faces, the instruction 146 proceeds to a decision step 170 to determine if any of the detected faces are recognized. The memory 162 of the controller 74 and/or facial recognition software 142 of the camera 140 may include a database of images of people 138 to compare to the image captured by the camera 140. If none of the faces in the captured image are recognized, the instruction 146 proceeds to a step 174 where the camera 140 is deactivated. The camera 140 may enter a sleep and/or hibernation mode. Additionally or alternatively, the camera 140 may return to an off mode. After the step 174, the instruction 146 returns to the first step 150.

Returning to the decision step 170, if faces in a captured image are recognized by the controller 74 and/or the facial recognition software 142 of the camera 140, the instruction 146 proceeds to a decision step 178. In the decision step 178, the controller 74 and/or the camera 140 determines whether the faces recognized are granted privileges. The privileges may be applied to a list of people 138 and/or images stored in the memory 162 of the controller 74 and/or in the facial recognition software 142 of the camera 140. The privileges may correspond to the owner of the vehicle 10, the family of the owner, and/or common passengers in the vehicle 10. Additionally, the privileges may differ based on the person 138 detected by the camera 140. The privileges may result in deactivation of the camera 140, specific messages 190 displayed on the grille assembly 14, access to the vehicle 10, or other features of the vehicle 10. For example, if the owner of the vehicle 10 is detected, then more specific messages 190 may be displayed. In another example, if a stranger is detected, then a more generalized message 190 may be displayed (e.g., battery charge level). In a further example, certain privileges may be applied to a service person providing maintenance or other services to the vehicle 10. The messages 190 may be universal messages 190 or may be customized by a user. If the controller 74 determines that privileges do apply to the person 138 within the captured image, then the instruction 146 proceeds to a step 182 and the controller 74 grants the privilege and the camera 140 may not record the images. Alternatively, if the person 138 captured in the image by the camera 140 is determined by the controller 74 to not receive privileges, then the instructions 146 proceed to a step 186, and the camera 140 may record the images and/or video of the field of view 144 while the person 138 remains in the field of view 144. The images may be recorded by the camera 140 and may be stored in the memory 162 of the controller 74 and/or within the camera 140. The step 186 may also include the grille assembly 14 displaying specified messages 190 to a person 138 within the field of view 144 of the camera 140. After privileges are granted or the recording has stopped, the instructions 146 may return to the first step 150. It is contemplated that the capacitive portion 106 and/or the camera 140 may activate based on sensed or detected objects 134 and/or people 138 within the sensor field 130 and the field of view 144, respectively. Further, it is contemplated that the activation of the capacitive portion 106 and/or the camera 140 may occur without a key fob or Bluetooth device.

Figure 6:
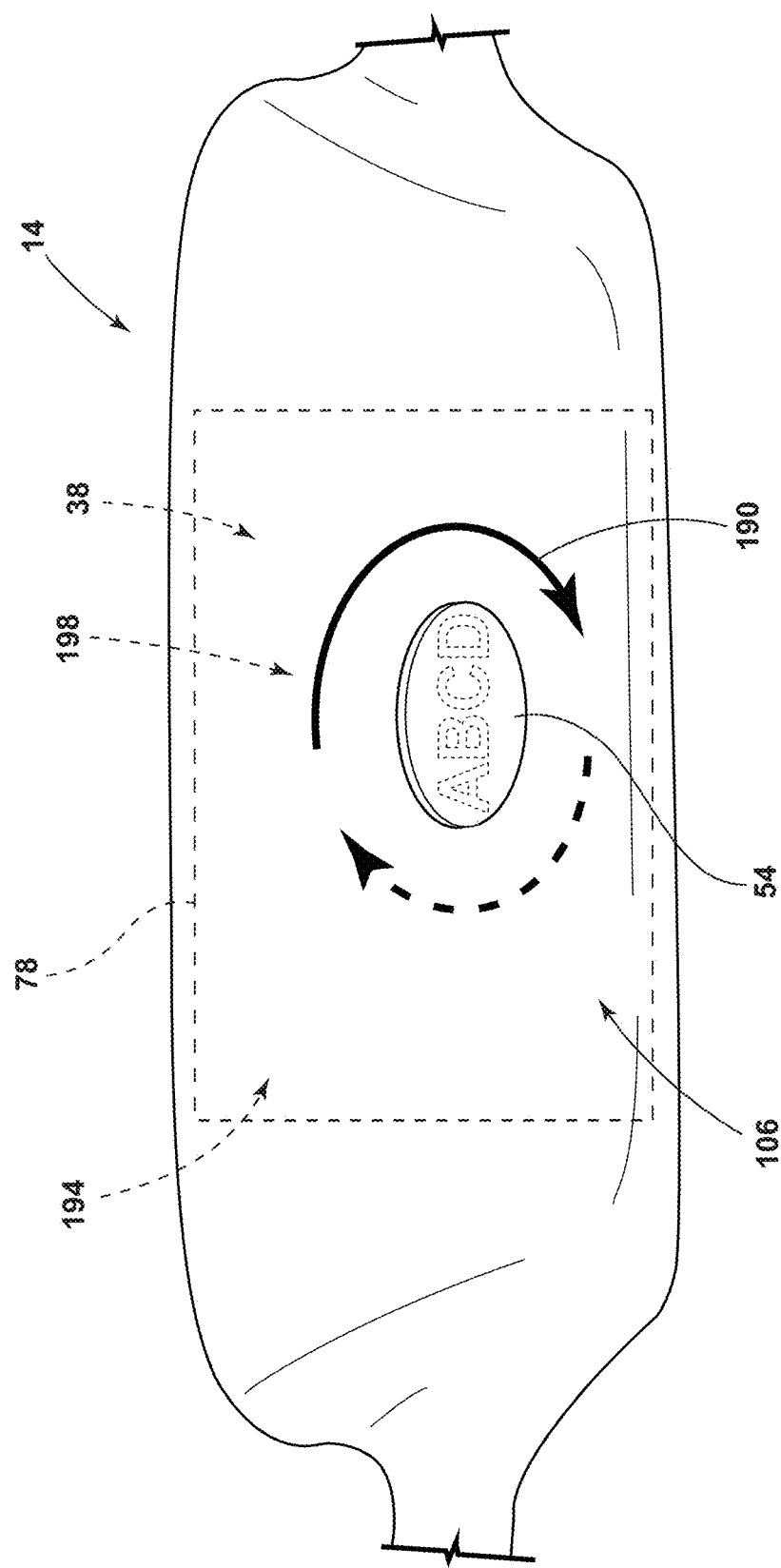
FIG. 6 is a partial front perspective view of a grille assembly displaying a message, according to one example.

Referring now to FIG. 6, the grille assembly 14 may be configured to display a message 190. As illustrated in the example in FIG. 6, the message 190 is a circular symbol with a moving gradient. In other words, the message 190 is an arrow or other feature that circles the emblem 54. The depicted message 190 may indicate to pedestrians and/or other drivers that the vehicle 10 will turn once the vehicle 10 is started. In this example, the message 190 may indicate an intent to turn in the future, but the turn may not be an immediate action. For example, a vehicle 10 parked near a curb may show the depicted message 190 to show the vehicle 10 will turn into traffic once the vehicle 10 is started. The controller 74 (FIG. 4) may operate to selectively activate each light source 38 of the plurality of light sources 38 to display the specified message 190.

In various examples, the grille assembly 14 may activate specified messages 190 when a person 138 (FIG. 4) is sensed by the capacitive portion 106 and/or detected by the camera 140 as being within a range of from about 5 feet to about 10 feet from the grille assembly 14. The messages 190 and/or the emitted light 110 from the light sources 38 may be visible through the film 46 and the optic layer 42. In a specific example, the grille assembly 14 may display a status of the vehicle 10 relating to battery charge and/or required services. In this example, the grille assembly 14 may indicate what service the vehicle 10 may need at a service depot. In another example, the grille assembly 14 may indicate that the vehicle 10 provides ride-sharing services and is available or may indicate the selected service to a user of the ride-sharing services. In another example, the light sources 38 of the grille assembly 14 may emit white light to allow the person 138 (FIG. 4) proximate to the vehicle 10 to see the vehicle 10 and/or an adjacent ground area to the vehicle 10. In this example, the grille assembly 14 may provide lighting to pedestrians in lower light and/or dark conditions. In another example, the light sources 38 may emit white light and the controller 74 may activate the camera 140 to record the person 138 (FIG. 4) proximate to the vehicle 10. In this example, the grille assembly 14 provides lighting for the pedestrian and the camera 140.

The grille assembly 14 may also display messages 190 using a flash rate and/or an intensity of emitted light 110. In various examples, the controller 74 may selectively activate the light sources 38 to emit white light in a pulse train. In such examples, the emitted light 110 may be emitted at a low pulse rate and/or a low intensity when the vehicle 10 is moving below a predetermined speed. Further, the emitted light 110 may be emitted at a high pulse rate and/or a higher intensity when the vehicle 10 is moving at and/or above a predetermined speed. In a specific example, the emitted light 110 may be emitted at a low pulse rate and low intensity when the vehicle 10 is traveling less than 25 miles per hour. However, the predetermined speed may vary, and/or may be adjustable. Additionally or alternatively, as the vehicle 10 approaches 25 miles per hour, the intensity and/or the pulse rate of the emitted light 110 may continuously increase. Stated differently, the controller 74 may selectively activate the light sources 38 and/or adjust the color and/or intensity of the emitted light 110 based on a velocity of the vehicle 10. In some examples, the increase in pulse rate and/or intensity may be linear, and in other examples, the increase may be parabolic or exponential. The pulse rate and intensity of the emitted light 110 of the grille assembly 14 may comply with vehicle regulations.

In various examples, the grille assembly 14 may also display a message 190 relating to the acceleration and/or declaration of the vehicle 10. In such examples, the controller 74 may activate the light sources 38 in a specified pattern. For example, when the vehicle 10 is decelerating, the light sources 38 may activate from outer edges 194 of the matrix 78 to a center 198 of the matrix 78. The emitted light 110 may then be shown moving inward along the grille assembly 14. In another example, the light sources 38 may activate from the center 198 of the matrix 78 towards the outer edges 194. The emitted light 110 may then be shown moving outward along the grille assembly 14.

It is contemplated that the light sources 38 may activate in various patterns to display various messages 190. It is further contemplated that the light sources 38 may activate in a top to bottom pattern, bottom to top pattern, left to right pattern, and/or right to left pattern to display various messages 190. Further, it is contemplated that the light sources 38 may be activated by the controller 74 to display various images, graphics, designs, videos, symbols, or words to display selected messages 190. Additionally, the optic layer 42 may be advantageous for directing emitted light 110 from the light sources 38 to display the various messages 190. The messages 190 may be determined by a user. Alternatively, the messages 190 may differ depending on the object 134 or person 138 sensed by the capacitive portion 106 detected by the camera 140, or privileges granted. The messages 190 disclosed herein are examples and not meant to limit the disclosure in any way. Accordingly, a vehicle communication system may at least partially include the grille assembly 14.

Referring now to FIG. 7, the controller 74 may be operably coupled to the camera 140 and the capacitive portion 106 and the light sources 38 of the grille assembly 14. The controller 74 may include a processor 202, other control circuitry, and the memory 162. Stored in the memory 162 and executable by the processor 202 are the instructions 146. The instructions 146 may include at least one instruction 146 for recognizing faces and granting privileges, as previously explained herein. The memory 162 may also include instructions 146 relating to displaying various messages 190 on the grille assembly 14, controlling a color of the emitted light 110, and controlling an intensity of the emitted light 110, in specific examples. The controller 74 may activate the light sources 38 based on a plurality of inputs and may modify the intensity of the emitted light 110 by pulse width modulation, current control, and/or any other known method. In various examples, the controller 74 may be configured to adjust color and/or intensity of the emitted light 110 from the light sources 38 by sending control signals to adjust an intensity or energy output level of the light sources 38. In such examples, the controller 74 may be configured to adjust the color and/or the intensity of the emitted light 110 in response to a velocity of the vehicle 10 and/or the images detected by the camera 140. The controller 74 may also selectively control the light sources 38, such that one, all, or a portion of the light sources 38 can be activated at any given time.

In various examples, the memory 162 of the controller 74 may also store a database of dielectric constants and calibration factors. In such examples, the camera 140 and the capacitive portion 106 of the grille assembly 14 may operate in conjunction as parking sensors. The capacitive portion 106 may sense a distance to the object 134, while the camera 140 may use stored rules 206 to recognize common objects 134. The controller 74 may then assign the proper dielectric constant and calibration factor for the size of the object 134 from the database stored in the memory 162.

Figure 8:
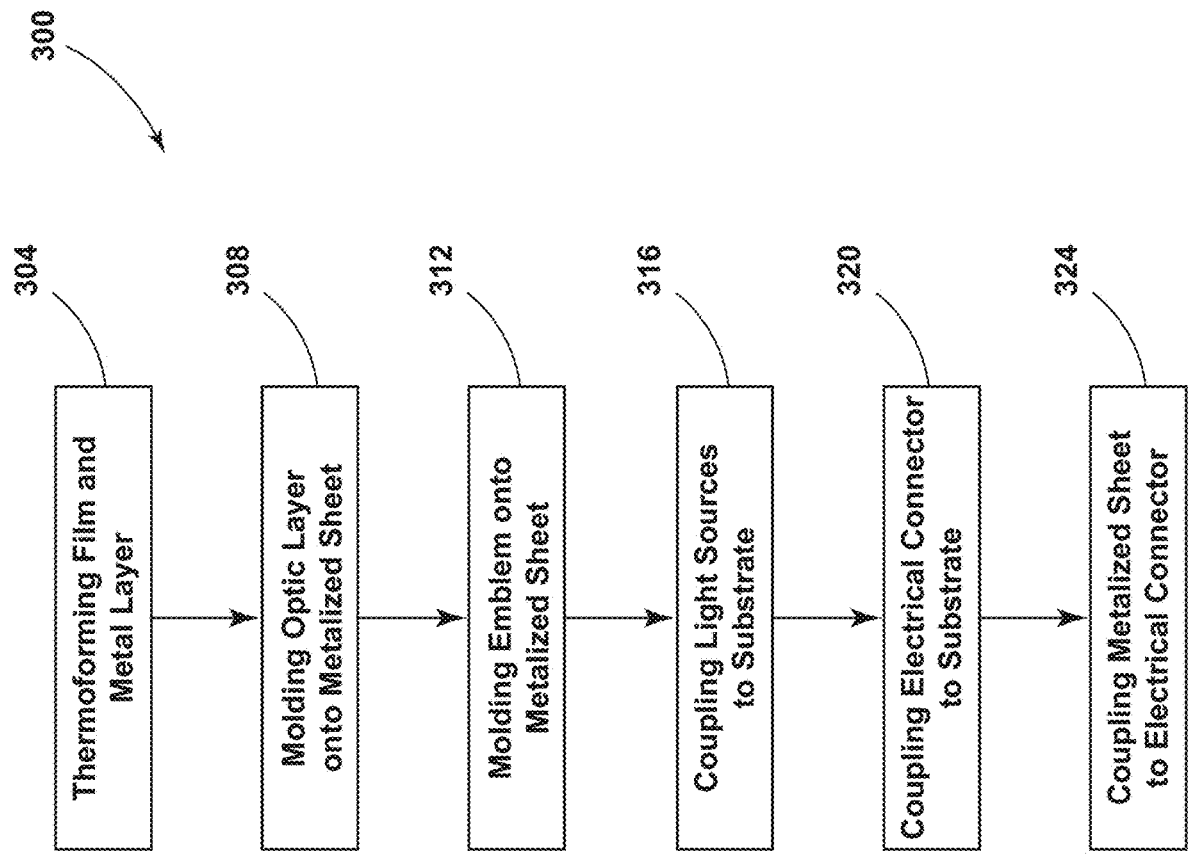
FIG. 8 is a flow diagram of a method of manufacturing a grille assembly, according to one example.

Referring now to FIG. 8, a method 300 of manufacturing the grille assembly 14 may include a step 304 of thermoforming the film 46 and the metal layer 50. The metal layer 50 may be applied to the inner surface 90 of the film 46 by a partial vacuum metallization process. Vacuum metallization allows for a uniform coating of the metal layer 50 on the inner surface 90 of the film 46. The resulting combination may be the metalized sheet 94. The film 46 and/or metal layer 50 may be heated and formed into a selected shape. The step 304 may also include applying the metal layer 50 to the film 46 via physical vapor deposition. In such examples, liquid metal is transformed to vapor and then formed into a thin metallic film 46. The film 46 may then be applied to a polymeric material, such as, for example, polycarbonates and other plastic materials. This may result in a thermoformed film 46. The step 304 may also include applying a metal material, such as, for example, chrome to the thermoformed film 46.

The method 300 may also include a step 308 of molding the optic layer 42 to the metalized sheet 94. In various examples, the step 308 may include insert molding and/or injection molding the optic layer 42 and/or other optic members onto the metalized sheet 94. The step 308 may also include die stamping the film 46, and applying the optic layer 42 thereon.

A next step 312 of the method 300 may include molding the emblem 54 to the metalized sheet 94. In various examples, the emblem 54 may be insert molded onto the metalized sheet 94. Additionally or alternatively, the emblem 54 may also be insert molded between the metal layer 50 and the film 46.

The method 300 may also include a step 316 of coupling the light sources 38 to the substrate 30. The step 316 may also include coupling the PCB 34 to the substrate 30 and the light source 38 to the PCB 34. The light sources 38 and the PCB 34 may be coupled via adhesives, in a specific example.

A next step 320 may include coupling the electrical connector 102 to the substrate 30. The grille assembly 14 may include a single electrical connector 102 or multiple electrical connectors 102. The electrical connector 102 may be coupled to the PCB 34 proximate the light sources 38. In an example where the grille assembly 14 includes a ZIF electrical connector 102, the step 320 may also include operating a lever on the electrical connector 102 to separate the spring contacts of the electrical connector 102. Accordingly, an integrated circuit may then be inserted into the electrical connector 102 with minimal or no downward force.

The method 300 may further include a step 324 of coupling the metalized sheet 94 to the electrical connector 102. The coupling of the metalized sheet 94 to the electrical connector 102 provides for the capacitive portion 106 of the grille assembly 14. Additionally or alternatively, the step 324 may include coupling the film 46 and the metal layer 50 to the electrical connector 102 to provide the capacitive portion 106.

Use of the present disclosure may provide a variety of advantages. For example, the grille assembly 14 may be used to communicate various messages 190 to pedestrians and/or other drivers. Additionally, the capacitive portion 106 of the grille assembly 14 may send a signal to the controller 74, which then activates and/or deactivates the camera 140 when an object 134 passes within a predetermined distance from the vehicle 10. The activation of components of the grille assembly 14 (e.g., the capacitive portion 106, the camera 140, etc.) and the displaying of a message 190 may be done without a key fob or a Bluetooth device. Further, the flexibility of the metalized sheet 94, the PCB 34, and the optic layer 42 may allow the grille assembly 14 to flex in response to a contact or other force acting on the grille assembly 14.

According to various examples, a vehicle communication system includes a vehicle body panel and a camera having a field of view. The camera is disposed on the vehicle body panel. A grille assembly is coupled to the vehicle body panel. The grille assembly includes a plurality of light sources, an optic layer defining channels disposed adjacent to the light sources, and a metalized sheet disposed on the optic layer. A controller operably coupled to the camera and the plurality of light sources. Embodiments of at least one aspect can include any one or a combination of the following features:
- an electrical connector coupled to the metalized sheet;
- a grille assembly includes a capacitive portion having a sensor field extending outward from a vehicle body panel;
- a controller, wherein a capacitive portion sends a signal to the controller in response to sensing an object within a sensor field, and wherein the controller sends a corresponding signal to a camera to activate the camera;
- a field of view of a camera extends outward of a vehicle body panel;
- an exterior surface a grille assembly forms a substantially continuous surface with a vehicle body panel; and
- a camera includes facial recognition software.

According to various examples, a vehicle communication system includes a vehicle panel and a grille assembly coupled to the vehicle panel. The grille assembly includes a substrate, at least one light source coupled to the substrate, a film positioned over the at least one light source, and a metal layer coupled to an inner surface of the film. A controller is operably coupled to the light sources, wherein the controller activates the light sources. Embodiments of at least one aspect can include any one or a combination of the following features:

a controller selectively activates at least one light source to display a message on the grille assembly;

a message includes a circular symbol with a moving gradient;

a controller adjusts an intensity of emitted light of at least one light source based on a vehicle velocity;

a camera coupled to a vehicle panel, wherein the camera includes a field of view extending outward from an vehicle panel;

a grille assembly includes a capacitive portion that operates in conjunction with the camera as a parking sensor; and a camera includes rules for recognizing an object, and wherein the controller assigns a dielectric constant and calibration factor to the object.

According to various examples, a grille assembly communication system includes a substrate and a printed circuit board disposed on the substrate. A plurality of light sources is coupled to the printed circuit board. The plurality of light sources is disposed in a matrix. An optic layer is disposed adjacent to the plurality of light sources and defines channels over each light source of the plurality of light sources. A film is positioned over the optic layer. Embodiments of at least one aspect can include any one or a combination of the following features:

a metal layer disposed on an inner surface of a film and an electrical connector coupled to the metal layer to form a capacitive portion having a sensor field;

an the optic layer defines ribs extending between adjacent light sources of a plurality of light sources;

a controller selectively activates each light source of a plurality of light sources to display a message;

a camera is operably coupled to a controller and includes a field of view; and an optic layer deforms in response to a predetermined force acting on the optic layer.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle communication system, comprising:
a vehicle body panel;
a camera having a field of view, wherein the camera is disposed on the vehicle body panel; and
a grille assembly coupled to the vehicle body panel, wherein the grille assembly includes:
a plurality of light sources;
an optic layer defining channels disposed adjacent to the light sources;
a metalized sheet disposed on the optic layer; and
an electrical connector coupled to the metalized sheet.

2. The vehicle communication system of claim 1, wherein the grille assembly includes a capacitive portion having a sensor field extending outward from the vehicle body panel.

3. The vehicle communication system of claim 2, further comprising:
a controller, wherein the capacitive portion sends a signal to the controller in response to sensing an object within the sensor field, and wherein the controller sends a corresponding signal to the camera to activate the camera.

4. The vehicle communication system of claim 1, wherein the field of view of the camera extends outward of the vehicle body panel.

5. The vehicle communication system of claim 1, wherein an exterior surface the grille assembly forms a substantially continuous surface with the vehicle body panel.

6. The vehicle communication system of claim 1, wherein the camera includes facial recognition software.

7. A vehicle communication system, comprising:
a vehicle panel;
a grille assembly coupled to the vehicle panel, wherein the grille assembly includes:
a substrate;
at least one light source coupled to the substrate;
a film positioned over the at least one light source; and
a metal layer coupled to an inner surface of the film; and
a controller operably coupled to the light sources, wherein the controller activates the light sources, wherein the controller adjusts an intensity of emitted light of the at least one light source based on a vehicle velocity.

8. The vehicle communication system of claim 7, wherein the controller selectively activates the at least one light source to display a message on the grille assembly.

9. The vehicle communication system of claim 8, wherein the message includes a circular symbol with a moving gradient.

10. The vehicle communication system of claim 7, further comprising:
a camera coupled to the vehicle panel, wherein the camera includes a field of view extending outward from the vehicle panel.

11. The vehicle communication system of claim 10, wherein the grille assembly includes a capacitive portion that operates in conjunction with the camera as a parking sensor.

12. The vehicle communication system of claim 11, wherein the camera includes rules for recognizing an object, and wherein the controller assigns a dielectric constant and calibration factor to the object.

13. A grille assembly communication system, comprising:
a substrate;
a printed circuit board disposed on the substrate;
a plurality of light sources coupled to the printed circuit board, wherein the plurality of light sources is disposed in a matrix;
an optic layer disposed adjacent to the plurality of light sources and defining channels over each light source of the plurality of light sources;
a film positioned over the optic layer;
a metal layer disposed on an inner surface of the film; and
an electrical connector coupled to the metal layer to form a capacitive portion having a sensor field.

14. The grille assembly communication system of claim 13, wherein the optic layer defines ribs extending between adjacent light sources of the plurality of light sources.

15. The grille assembly communication system of claim 13, further comprising:
   a controller, wherein the controller selectively activates each light source of the plurality of light sources to display a message.

16. The grille assembly communication system of claim 15, further comprising:
   a camera operably coupled to the controller and having a field of view.

17. The grille assembly communication system of claim 13, wherein the optic layer deforms in response to a predetermined force acting on the optic layer.

* * * * *